United States Patent
Heidasch et al.

(10) Patent No.: US 9,031,886 B2
(45) Date of Patent: May 12, 2015

(54) PLUGGABLE MODULES IN A CASCADING LEARNING SYSTEM

(71) Applicants: SAP SE, Walldorf (DE); intelligent views GmbH, Darmstadt (DE)

(72) Inventors: Robert Heidasch, Speyer (DE); Stefan Scheidl, Dieburg (DE); Michael Neumann, Speyer (DE); Stephan Brand, Wiesloch (DE); Nico Licht, Heidelberg (DE); Klaus Reichenberger, Frankfurt (DE); Archim Heimann, Wiesloch (DE); Steffen Moldaner, Riedstadt (DE); Thomas Pohl, Leimen-St. Ilgen (DE)

(73) Assignees: SAP SE, Walldorf (DE); intelligent views GmbH, Darmstadt (DE)

( * ) Notice: Subject to any disclaimer, the term of this patent is extended or adjusted under 35 U.S.C. 154(b) by 237 days.

(21) Appl. No.: 13/623,596

(22) Filed: Sep. 20, 2012

(65) Prior Publication Data
US 2014/0081894 A1    Mar. 20, 2014

(51) Int. Cl.
G06F 15/18     (2006.01)
G06N 3/08      (2006.01)
G06F 17/30     (2006.01)

(52) U.S. Cl.
CPC ............................ *G06F 17/30864* (2013.01)

(58) Field of Classification Search
USPC ........................................................ 706/25
See application file for complete search history.

(56) References Cited

U.S. PATENT DOCUMENTS

| | | | |
|---|---|---|---|
| 7,774,404 B2 * | 8/2010 | Heidasch ...................... 709/201 |
| 8,156,473 B2 * | 4/2012 | Heidasch ...................... 717/124 |
| 8,205,120 B2 * | 6/2012 | Heidasch et al. .............. 714/45 |
| 8,239,839 B2 * | 8/2012 | Rossmann et al. ........... 717/129 |
| 8,335,314 B2 * | 12/2012 | Heidasch ......................... 380/35 |
| 8,346,391 B1 * | 1/2013 | Anhalt et al. ................. 700/248 |
| 8,527,451 B2 * | 9/2013 | Heidasch ......................... 706/55 |
| 8,661,107 B2 * | 2/2014 | Hoffmann et al. ............ 709/223 |
| 8,725,760 B2 * | 5/2014 | Heidasch ...................... 707/769 |
| 8,731,998 B2 * | 5/2014 | Heidasch ...................... 705/7.38 |
| 8,762,384 B2 * | 6/2014 | Heidasch ...................... 707/741 |
| 8,769,502 B2 * | 7/2014 | Heidasch et al. ............. 717/129 |
| 8,798,969 B2 * | 8/2014 | Heidasch .......................... 703/2 |
| 2008/0319947 A1 | 12/2008 | Latzina et al. |
| 2012/0110016 A1 | 5/2012 | Phillips |

(Continued)

OTHER PUBLICATIONS

Dublin Core-Based Metadata Extracting Algorithm from RDF-Based Information Elements Hongbin Wang ; Daxin Liu ; Wei Sun Knowledge Discovery and Data Mining, 2008. WKDD 2008. First International Workshop on DOI: 10.1109/WKDD.2008.113 Publication Year: 2008 , pp. 114-117.*

(Continued)

*Primary Examiner* — Michael B Holmes
(74) *Attorney, Agent, or Firm* — Schwegman Lundberg & Woessner, P.A.

(57) ABSTRACT

A cascading learning system for semantic search is described including the generation, training and testing of a domain-specific module for a domain-specific search. One or more input elements and output elements are specified for the domain-specific module with reference to a domain that relates these elements together through data sets that include related metadata. The related metadata may include semantic terms that are incorporated into a contextual network applicable to the domain.

25 Claims, 7 Drawing Sheets

(56) References Cited

U.S. PATENT DOCUMENTS

2013/0117325 A1      5/2013    Heidasch
2013/0325757 A1    12/2013    Heidasch

OTHER PUBLICATIONS

Authenticating Image Metadata Elements Using Geolocation Information and Sun Direction Estimation Kakar, P. ; Sudha, N. Multimedia and Expo (ICME), 2012 IEEE International Conference on DOI: 10.1109/ICME.2012.82 Publication Year: 2012 , pp. 236-241.*

Management elements metadata extraction method for complex product manufacturing Ren Nan ; Zhang Xiao-feng Management Science and Engineering (ICMSE), 2013 International Conference on DOI: 10.1109/ICMSE.2013.6586342 Publication Year: 2013 , pp. 604-608.*

A quantitative analysis of unqualified Dublin Core Metadata Element Set usage within data providers registered with the Open Archives Initiative Ward, J. Digital Libraries, 2003. Proceedings. 2003 Joint Conference on DOI: 10.1109/JCDL.2003.1204883 Publication Year: 2003 , pp. 315-317.*

"Feedforward neural network", Wikipedia®, [Online]. Retrieved from the Internet: <URL: http://en.wikipedia.org/wiki/Feedforward_neural_network>, (Accessed Jun. 27, 2012), 4 pgs.

"U.S. Appl. No. 13/288,730 , Response filed Nov. 7, 2012 to Non Final Office Action mailed Aug. 15, 2012", 10 pgs.

"U.S. Appl. No. 13/288,730, Non Final Office Action mailed Aug. 15, 2012", 10 pgs.

"U.S. Appl. No. 13/288,730, Examiner Interview Summary mailed Feb. 25, 2013", 4 pgs.

"U.S. Appl. No. 13/288,730, Examiner Interview Summary mailed Nov. 20, 2014", 6 pgs.

"U.S. Appl. No. 13/288,730, Final Office Action mailed Sep. 5, 2014", 15 pgs.

"U.S. Appl. No. 13/288,730, Final Office Action mailed Dec. 11, 2012", 12 pgs.

"U.S. Appl. No. 13/288,730, Non Final Office Action mailed Mar. 25, 2014", 13 pgs.

"U.S. Appl. No. 13/288,730, Response filed Apr. 1, 2013 to Final Office Action mailed Dec. 11, 2012", 11 pgs.

"U.S. Appl. No. 13/288,730, Response filed Jun. 24, 2012 to Non Final Office Action mailed Mar. 25, 2014", 11 pgs.

"U.S. Appl. No. 13/288,730, Response filed Dec. 15, 2014 to Final Office Action mailed Sep. 5, 2014", 13 pgs.

"U.S. Appl. No. 13/489,226, Non Final Office Action mailed Sep. 4, 2014", 5 pgs.

* cited by examiner

PLUGGABLE MODULES IN A CASCADING LEARNING SYSTEM

FIELD

The present disclosure relates generally to data searches and more particularly to optimizing access to enterprise data.

BACKGROUND

Generally, a search engine is a program that is designed to search for information from a variety of sources of data, such as the World Wide Web and File Transfer Protocol (FTP) servers. Many of these conventional search engines are designed to conduct searches based on a matching of keywords. For example, a conventional search engine searches documents for keywords that are specified by a user and returns a list of documents where the keywords are found.

However, conventional search engines often do not take into account the semantic meaning of the keywords found in the enterprise data, such as, for example, business objects and business documents. To clarify this discussion, a "business object," as used herein, may refer to a representation of a business entity, such as an employee or a sales order, in an enterprise system. Accordingly, a business object may be a type of entity inside the business layer in an n-layered architecture of object-oriented computer programs. A business object encompasses both the functions (in the form of methods) and the data (in the form of attributes) of this business entity.

When searching, for example, business objects, a typical search engine may simply search the attributes associated with business objects. For example, in response to receiving a query for "employees located in San Diego," the typical search engine may return a business object of a company with a name of "San Diego Surf Shop" because the business object of the company has an attribute containing "San Diego." However, this is not what the user wants because the business record is not an employee, nor is the company even located in San Diego. As a result, many of these conventional search engines are notoriously inaccurate at searching for enterprise data containing keywords with meanings that depend on context of the attribute. Thus, there is a need for improved methods and related systems directed to data searches.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
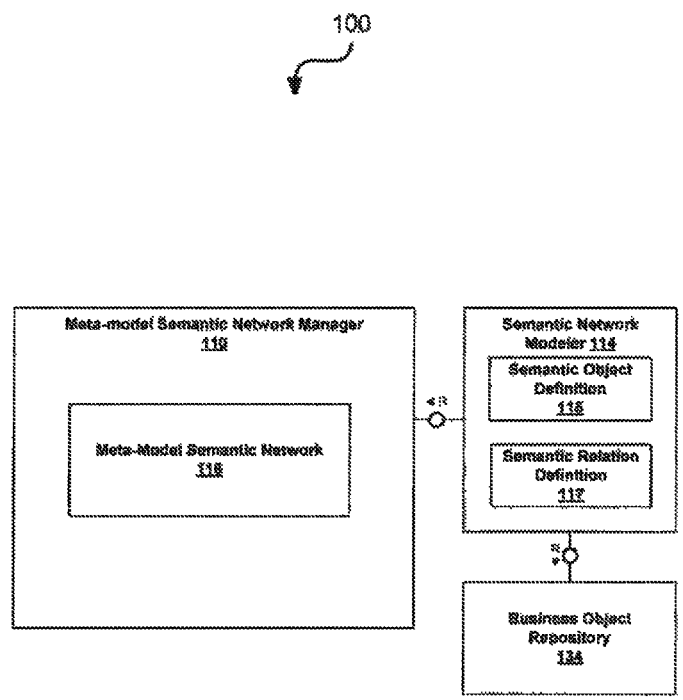
FIG. 1 is a block diagram depicting an architectural overview of a system for determining existing relationships between objects in a meta-model semantic network, in accordance with an example embodiment.

The description that follows includes illustrative systems, methods, techniques, instruction sequences, and computing machine program products that embody illustrative embodiments of the present disclosure. In the following description, for purposes of explanation, numerous specific details are set forth in order to provide an understanding of various embodiments of the inventive subject matter. It will fee evident, however, to those skilled in the art that embodiments of the inventive subject matter may be practiced without these specific details. In general, well-known instruction instances, protocols, structures and techniques have not been shown in detail.

As used herein, "enterprise data" includes data maintained by an enterprise, such as a business, individual, group, or any other organization. Examples of enterprise data include, for example, business objects, business documents, notes, bookmarks, annotations, terminology, or any other business concept. In some embodiments, the enterprise data may be extracted from heterogeneous sources (e.g., an email database server and a purchase order database). Further, the enterprise data may be structured (e.g., type defined via a schema, such as extensible markup language (XML)) or unstructured (e.g., Word documents).

As used herein, a "semantic network" includes a network of semantic objects connected through semantic relations, A "semantic object," as used herein, includes a conceptual representation of a notion recognized by an enterprise, such as a product, person, employee, customer, business, document, case, project, business object, term, or any other suitable data (e.g., terminology related, objects—term, concept, domain, and so forth). A "semantic relation," as used herein, includes a relationship between two or more semantic objects. Such relationships may have attributes and a type or definition that provides a conceptual meaning to how the two or more semantic objects are related to each other.

As used herein, a "meta-model semantic network" includes a semantic network generated teed on a meta-model of the enterprise data. A "meta-model," as used herein, is a model that characterizes the conceptual meaning of elements of a business object definition. In turn, a "model" is a characterization of instances of enterprise data. A definition of a business object is an example of a model. The definition may model an instance by defining the attributes (e.g., an address) associated with the business object. The meta-model then models these attributes and gives meaning to them (e.g., an address is a location).

As used herein, "semantic information" includes information that provides conceptual meaning to enterprise data. Such semantic information may associate particular enterprise data with concepts maintained by an enterprise. For example, a collection of attributes (e.g., street, city, state, zip code, and the like) may be given a meaning of understanding (e.g., location). Such semantic information may be formally organized as "semantic object definitions" and "semantic relation definitions."

Modern business applications typically require access to information defined in many systems and business objects (e.g., sources of structured information) and located in many documents (e.g., sources of unstructured information). This information together with business terminology can be reflected in a contextual network—a network which represents semantic objects and relations among them.

Therefore, certain embodiments define a cascading self-learning algorithm/solution that uses the observed system data to look for documents not specified by the end-user but related to what the end-user is looking for and generate related domain-specific modules that capture essential details for specific search applications and can be easily included in related systems (e.g., as pluggable modules). In one embodiment an additional functionality that is supported by the cascading learning system is related to certain calculated business values. A question or an inquiry from an end-user could be dispatched to a module that is trained to respond with some business value to the particular end-user request. In this case, the result corresponds to calculated business-relevant information. Therefore, the output may be defined by the module provider—how the module is built and what kind of business data is used as training set. The business data may also depend on the architecture.

FIG. 1 is a block diagram depicting an architectural overview of a system for determining existing relationships between objects in a meta-model semantic network, in accordance with an example embodiment. The networked system 100 includes a meta-model semantic network manager 110 thus is in communication with a semantic network modeler 114. The meta-model semantic network manager 110 and the semantic network modeler 114 may be embodied, individually or in combination, in a computing device in the form of, for example, a personal computer (PC), a server computer, or any other suitable computing device. In various embodiments, the computing device may be used to implement computer programs, logic, applications, methods, processes, or software to determine existing relationships between objects in a meta-modes semantic network using, information, as described in more detail below.

The meta-model semantic network manager 110 is designed to maintain the meta-model semantic network 116. As described above, the meta-model semantic network 116 may be a semantic network that includes semantic objects and semantic relations that, provide meaning to particular enterprise data, such as, for example, business objects, business documents, notes, bookmarks, annotations, terminology, or any other business concept or enterprise data used within the enterprise. For example, John Smith, as a concept within the enterprise, may be associated with various business objects (e.g., a sales order, employee record, customer record, or any other suitable business object) and with documents created by or otherwise involving John Smith.

The meta-model semantic network manager 110 may also include a contextual network graph generator (not shown) that calculates information of cost and energy between nodes. It also generates a unique identifier for each node and associated edge and stores the unique identifier and the information in a meta-model semantic network database.

As described above, the semantic objects and relations stored in the meta-model semantic network 116 may be based, in part, on semantic object definitions 115 and semantic relation definitions 117. Such semantic definitions may be based on a meta-model of the enterprise data. For example, the semantic network modeler 114 is a modeling tool that uses a meta-modeling based approach to generate a semantic object definition 115 and a semantic relation definition 117.

The semantic object definition 115 and the semantic relation definition 117 may extend the definitions of enterprise data (e.g., business objects) at the meta-model level to provide semantic information. Such semantic information provides supplemental meaning to the elements, attributes, and relations between the business objects. As an example, the definition of an employee business object may be associated with an address. In some embodiments, such an address may be a field of the business object, and, in other embodiments, such an address may be represented by a separate business object in this example, the semantic network modeler 114 may extend the definition of the employee definition, at the meta-model level, to give the address field the semantic meaning of location. That is, the association between the employee and the address characterizes the location of the particular employee.

In some embodiments, to assist at an enterprise user in creating the semantic object definition 115 and the semantic relation definition 117, the semantic network modeler 114 may extract existing enterprise definitions stored in a business object repository 134. For example, a source of business object definitions in an SAP environment may be the SAP Enterprise Service Repository (ESR) or the SAP By-Design Model Repository. Once the business object definitions are extracted from the business object repository 134, the semantic network modeler 114 may be configured to provide, for example, a user interface to art enterprise user so that the enterprise user can model such definitions in a way that gives semantic meaning to the business objects.

The semantic network modeler 114 may be configured to send the semantic object definition 115 and the semantic relation definition 117 to the meta-model semantic network manager 110. In turn, the meta-model semantic network manager 110 may generate rule definitions, which are then sent to a text analyzer (not shown). The rule definitions may contain the tokens and expressions with types and meta-data. For example, the rule definitions may include data derived from the semantic network modeler 114. Upon receiving data, the text analyzer uses the rule definitions to determine the terms used in documents and business objects. Analyzed data, in the form of objects and relations, are then sent to the meta-model semantic network manager 110 to be imported in the meta-model semantic network 116.

As described above, the meta-model semantic net work 116 may store relations with enterprise data. In some embodiments, the meta-model semantic network manager 110 may receive the enterprise data through the text analyzer. The text analyzer is part of a business extractor (not shown) that is configured to extract enterprise data from enterprise data sources and export objects and relations to the meta-model semantic network manager 110. The text analyzer may extract enterprise data stored by enterprise systems, such as a business object stored by a business application and/or a document stored by a document storage system. The business application and the document storage system are examples of enterprise data sources. As is explained below, data derived from the business object and the document may be obtained through a crawler. Based on the rule definition, the text analyzer communicates objects and relations to the meta-model semantic network manager 110.

The business terminology and the business information may be integrated in the networked system 100, also referred to as contextual network graph.

Elements of the contextual network graph include semantic objects and semantic relations (e.g., relations between particular semantic objects) which allow defining semantically particular business objects, documents, domains, terms, concepts, cases, notes, bookmarks, and the like (e.g., any kind of object that encapsulates some data and/or functionality). The semantic relation is an object defined by a respective meta-model that defines the link type, its importance (e.g., source weight—authority, see below), direction (e.g., simple/bidirectional), and so forth. The semantic relations also define the semantic compound relations—relation chains that allow finding experts (e.g., those who are working on a particular topic, using particular terminology, etc.), relevant documents (e.g., documents describing a sale of a particular material, etc.), and/or business partners (e.g., which supplier offers a material that fulfills conditions, etc.). One aspect of the present embodiment is scalability and performance of the contextual network graph.

With respect to FIG. 1, it should be appreciated that in other embodiments, the networked system 100 may include fewer or more components apart from those shown in FIG. 1, For example, in an alternative embodiment, the semantic network modeler 114 may be integrated within the meta-model semantic network manager 110. The components and respective modules shown in FIG. 1 may be in the form of software that is processed by a processor. In another example, as explained in more detail below, the components and respective modules shown in FIG. 1 may be in the form of firmware that is processed by application specific integrated circuits (ASIC), which may be integrated into a circuit board. Alternatively, the components and respective modules shown in FIG. 1 may be in the form of one or more logic blocks included in a programmable logic device (for example, a field programmable gate array). The components and respective modules shown in FIG. 1 may be adapted, and/or additional structures may be provided, to provide alternative or additional functionalities beyond those specifically discussed in reference to FIG. 1. Examples of such alternative or additional functionalities will be discussed in reference to the flow diagrams discussed below.

Figure 2:
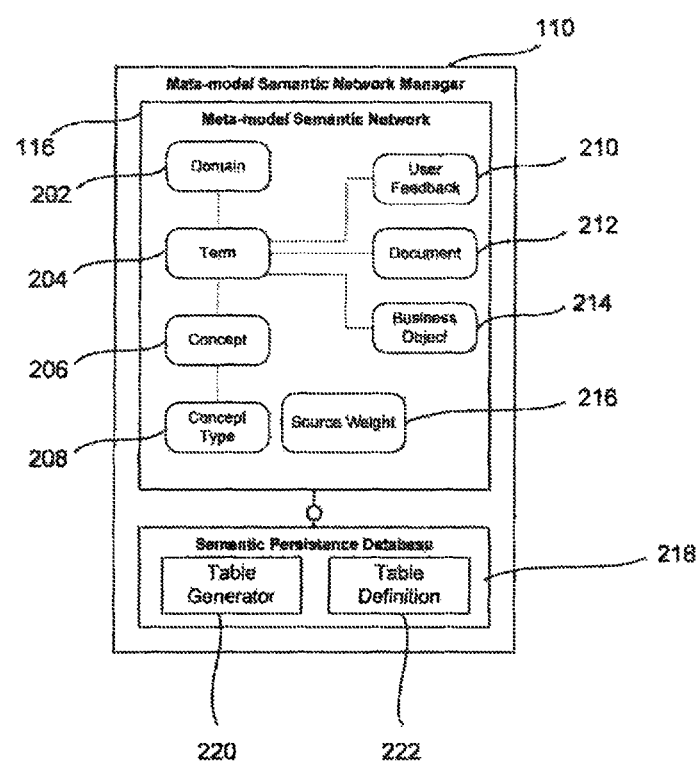
FIG. 2 is a block diagram showing a meta-model semantic network manager, in accordance with an example embodiment.

FIG. 2 is a block diagram showing a meta-model semantic network manager 110, in accordance with an example embodiment. The meta-model semantic network 116 includes nodes that link a term 204 to a domain 202 and a concept 206. In turn, the concept 206 may be linked us a concept type 208. Although FIG. 2 shows the nodes of the meta-model semantic network 116 as single entities, it is to be appreciated that meta-model semantic network 116 may include fewer or more nodes apart from those shown in FIG. 2. For example, a concept may be linked to one or more terms. Still further, additional and different nodes may be utilized by the meta-model semantic network 116.

The term 204 may be a word or phrase found in a business application, a document, the Internet, or manually created by an end-user. The concept 206 may refer to a unit of meaning to which the term 204 refers, such as a specific idea or notion. The concept 206 groups all of the terms that are used to express this idea as synonyms. For example, a product may be associated with multiple product names. Accordingly, each of the product names may be stored as separate terms in the meta-model semantic network 116 but all linked to the same product concept.

The domain 202 may associate the term 204 with a particular knowledge domain used within an enterprise. A collection of terms associated with a particular domain may then define the vocabulary used to describe concepts in a knowledge domain.

The concept type 208 may be metadata that characterizes the attributes associated with the concept 206. The concept type 208 may, for example, describe the attributes associated with the concept 206 for a particular product.

The meta-model semantic network 116 may also include nodes that relate the term 204 to enterprise data, such as a user feedback object 210, document 212, and business object 214. A user feedback object 210 may be any data embedded into enterprise data to provide further contextual data to the enterprise data. Notes, bookmarks, annotations, or any other user-embedded data are examples of user feedback objects 210.

In some embodiments, the semantic relations between the term 204 and the nodes 210, 212, 214 may be influenced by a source weight 216. The source weight 216 may be a weighting factor that makes some relationships more relevant. In some embodiments, the source weight 216 may indicate that a node is more or less relevant based on the user feedback object 210. In other cases, a document 212 that merely mentions some of the attributes of a concept 206 may receive a lesser weight than a business object 214 that includes the relevant relations and attributes.

The semantic insistence database 218 may store different meta-model semantic networks 116. For example, a first meta-model semantic network may include semantic relations and semantic objects optimized to respond to queries directed to sales orders (e.g., who created a sales order, which suppliers provide a certain part, etc.), while another meta-model semantic network may include semantic relations and semantic objects optimized to respond to queries related to finding experts in a domain.

In one embodiment, the semantic persistence database 218 may include a memory-based database comprising a table generator 220 and a table definition 222. The contextual network graph may use a unique identification of particular nodes and relations/edges. Each relation may contain information about the relations/edges, such as cost (e.g., how near the objects are located in a network graph) and energy (e.g., how often the relation is used).

Because in practice the business-relevant relations between business objects, documents, and business terminology (e.g., terms, concepts, and knowledge domains) are not infinite, the pre-calculation of the node relations (e.g., relation chain) can be reduced to the particular level which has significant influence on the solution performance.

The table generator 220 may generate information from a contextual network graph node with a collection of relation/edge entries that include at least some of the following information: (1) source network ID—key of metamodel semantic network where the source object is placed; (2) target network ID—key of metamodel semantic network where the end/target object is placed (This information allows handling of parallel networks that may be connected by "shared elements," e.g., elements that are defined in more networks and build a bridge between networks); (3) source object key—key of object where the begin/source object is placed: (4) target object key—key of object which is the end/target of a particular relation chain; (5) distance chain key—cumulated string representing the relation chain; (6) relation/chain level—length of the relation chain; (7) distance cost; and (8) distance energy.

The table definition 222 may include the source object key, source network ID, target object key, target network ID, distance chain key, the relation/chain level, the distance cost, and the distance energy. In addition, the table definition 222 may include respective updates for parallel networks. Such configured relation/edge entries allow the determining of chains with a number of relations/edges that is double the level number. For example, if the level is set to 3, then the number of relations/edges included in the determined chain is 6 (e.g., maximum level number).

Each object is identified by a unique identifier (a so-called object UUID—Universally Unique Identifier) and supported with a memory-based database. This is because the identifier could be, for example, a 64-bit unique identifier, which fits to the memory model of a memory-based database. Therefore, the present embodiment allows compression in memory of huge data amounts and allows for fast operations. In this case, each object/node and relation/edge may be located in a particular memory area of the memory addresses that can be used in the pointing/assignment mechanism and additionally reused for the hash value determination.

Figure 3:
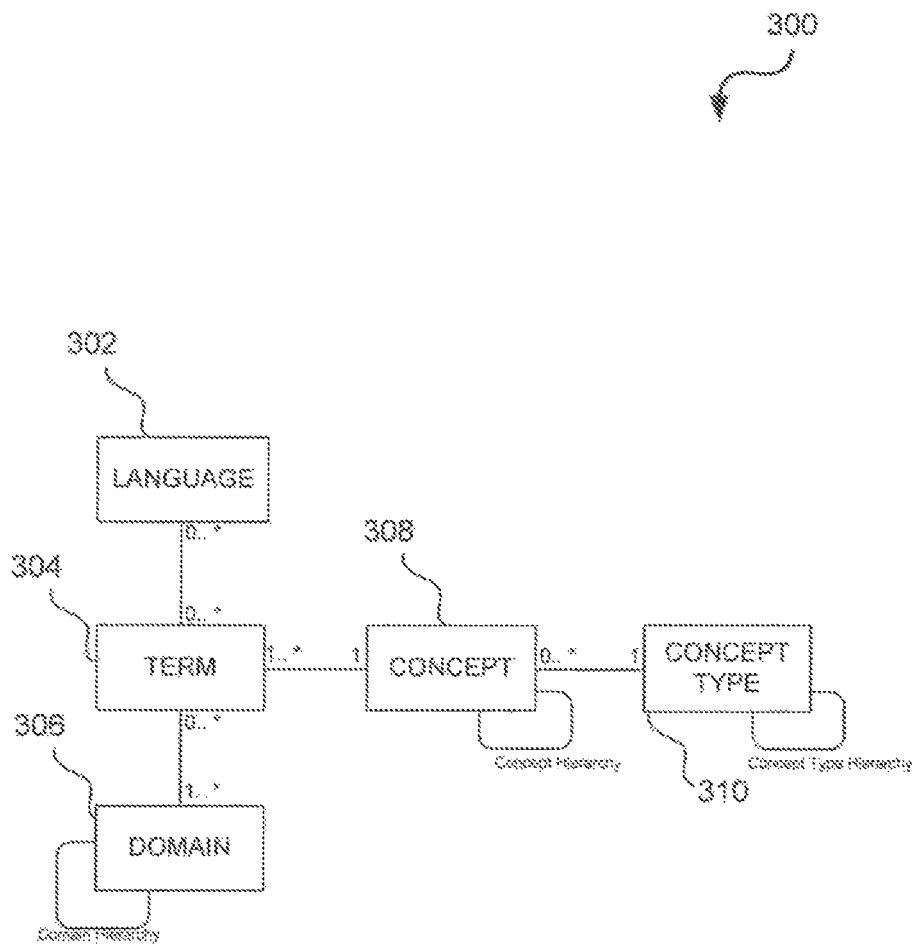
FIG. 3 is a block diagram illustrating terminology of a meta-model semantic network, in accordance with an example embodiment.

As FIG. 3 shows, a semantic network 300 links a term 304 to a language 302, one or more domains 306, and a concept 308. In turn, the concept 308 may be linked to a concept type 310. The links between the various components of the semantic network 300 may define the cardinality of the relationship between the components. For example, the link from the concept 308 to the concept type 310 shows a cardinality of "1," which is to be interpreted as an association with one and only one. Thus, the concept 308 may be linked to one and only one concept type 310. As another example, at the term end of the term—language link, the link shows a cardinality of "0, *,". The symbol "*" is to be interpreted as any number. Thus, a language may be linked to zero or many terms.

The term 304 may be a word or phrase found in a business application, a document, the Internet, or manually created by an end-user. The concept 308 may refer to a unit of meaning to which the term 304 refers, such as a specific idea or notion. The concept 308 groups all the terms that are used to express the specific idea as synonyms. For example, the terms "COLGATE," COLGATE-PALMOLIVE," "C-P," and "CP" may refer to the concept of the company Colgate-Palmolive. Accordingly, "COLGATE," "COLGATE-PALMOLIVE," "C-P," and "C-P" are all synonyms for the Colgate-Palmolive company concept.

The domain 306 may define the knowledge domain or a particular field of knowledge. The domain 306 may group terms used within a particular context. In some cases, the concept 308 related to the term 304 may depend on the domain 306. For example, the meaning of the term Colgate may differ depending on whether the term 304 is used in the domain 306 of toothpaste rather than in the domain 306 of colleges. As FIG. 3 shows, the domain 306 may be associated with a hierarchy of domains.

The language 302 may distinguish the language that the term 304 is used in. For example, the concept 308 that term 304 relates to may depend on the language 302 associated with the term 304. For example, the term "SOY" associated with the language "SPANISH" will be distinguishes from the term "SOY" associated with, the language "ENGLISH."

The concept type 330 may be metadata that characterizes the attributes associated with the concept 308. The concept type 310 may, for example, describe the attributes associated with the concept "COMPANY," or any other suitable concept 308.

The semantic network 300 illustrated in FIG. 3 is effective when the end-user is looking for documents with specific terms. However, sometimes the end-user is looking for information related to a business document, but has not directly included the terms of the documents its his/her search. For example, the end-user is writing a document (e.g. an error message to SAP) and is looking for a component that may best fit the situation. In another example, the end-user is looking for similar problems in hope that someone had a similar problem and already found the solution involving complex business situations.

The present disclosure describes a self-learning and self-adapting solution for a high performance platform, such as a SAP HANA platform, that uses semantic terminology (e.g., searchable terms) to find and/or calculate the best answers and/or most probable results. The system is also able to integrate different business data source (e.g., document management systems, business applications, and their business objects).

The already existing business data may be initially used as a learning system. This means that after the installation and initialization of the cascading learning system, the end-user obtains the best known information/data. Additionally, the end-user feedback (e.g., generated when the end-user uses the found/calculated information in the next business step) is used to teach the system. In other words, the next end-user profits from a previous end-user's actions, and the system provides better information to find similar documents and solutions. This means that the primary focus is on the learnability and adaptability of the search system, and its integration with SAP HANA platform provider brings the additional advantages to its adoption in a customer-specific environment.

Figure 4:
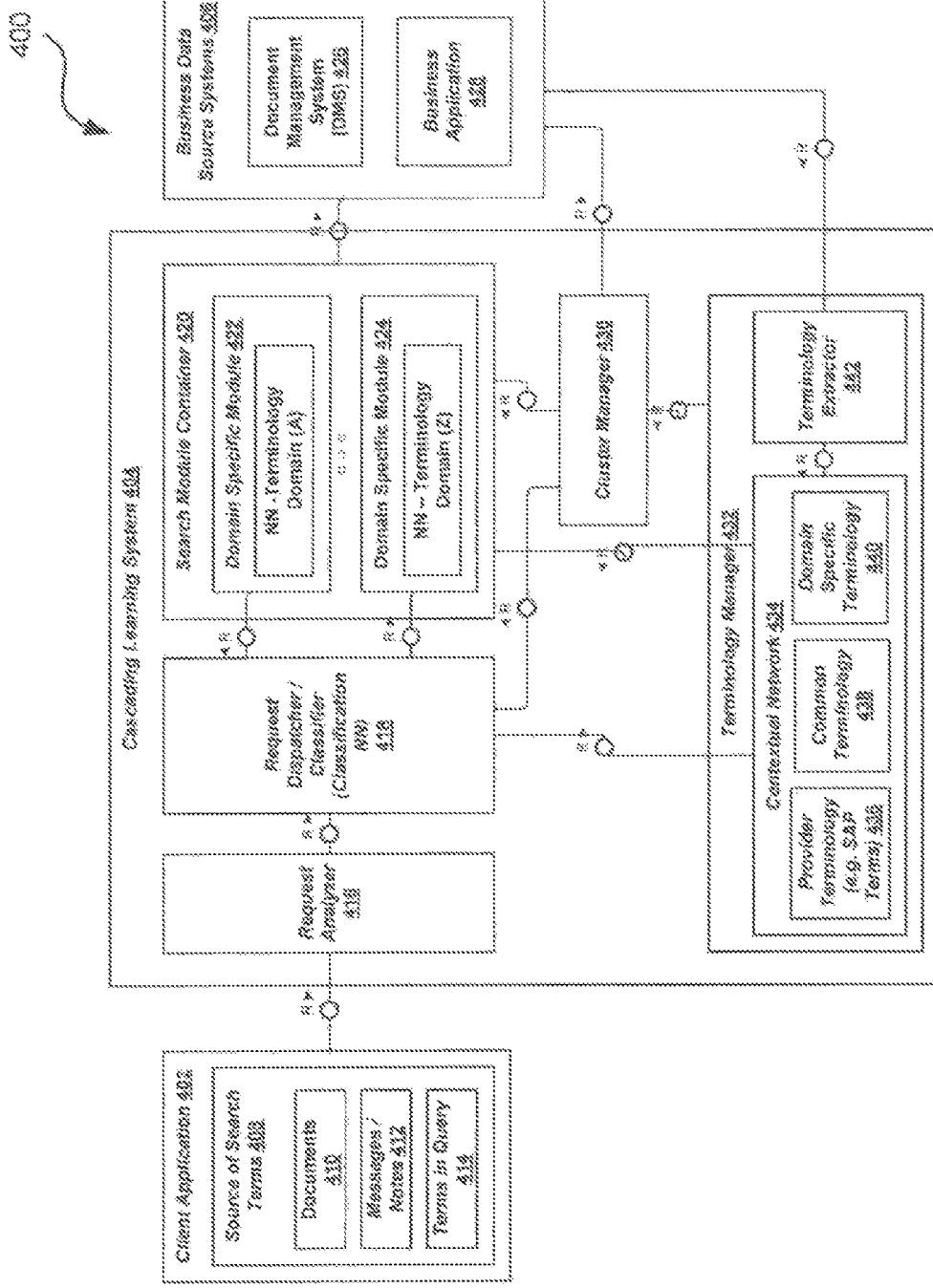
FIG. 4 is a block diagram illustrating an architectural overview of a cascading learning system, in accordance with an example embodiment.

FIG. 4 is a block diagram illustrating an architectural overview 400 of a cascading learning system 404, in accordance with an example embodiment. The cascading learning system 404 uses learning algorithms to provide information stored in different knowledge repositories and business applications (also referred to as business data source systems). The integration of the cascading learning system 404 with business data source systems is done using domain-specific modules that are highly specialized to provide information (e.g., search for data or calculate data) available for particular business data source systems.

In one embodiment, the cascading learning system 404 includes a request analyzer 416, a request dispatcher and classifier 418, a search module container 420, a terminology manager 432, and a cluster manager 430.

The request analyzer 416 receives a request for search terms from a client application 402. The client application 402 may submit the request based on a source of search terms 408 that includes documents 410, messages and notes 412, and/or terms in query 414. The request analyzer 416 determines term context in the request and normalizes request data from the term context. For example, the request analyzer 416 builds the word/sentence "normal" representation, plural/singular conversion, and so forth.

The request dispatcher and classifier 418 classifies the normalized request data to a corresponding domain-specific module 423, 424 and dispatches the normalized request data to the corresponding domain-specific module 422, 424. In one embodiment, the request dispatcher and classifier 418 includes an artificial neural network (ANN) that implements a classification algorithm. The request dispatcher and classifier 418 may be trained to use the prepared/normalized request and may dispatch the request to the responsible domain-specific module (one or many). The ANN may also produce additional information that may help provide information.

The search module container 420 includes several domain-specific modules 422, 424, where each domain-specific module 422, 424 may be configured to generate a prediction with a trained probability of an expected output. For example, the search module container 420 supports running many highly-specialized domain-specific modules 422, 424. The domain-specific modules 422, 424 may include feed-forward neural networks (FFNN) that are specialized in providing information (e.g., calculating which document is probably the most interesting for the end-user) and/or calculating response information based on previously learned calculation function (e.g., net income and a function of gross income, operational costs, taxes paid, etc.). Therefore, the FFNN is a learned searching module that "predicts" the expected output of searched documents and/or calculated information. It should be noted that the probability can be calculated for the particular test set, but may vary for the end-user request. Therefore, the system 404 supports so-called online learning (e.g., the end-user response is taken in to constantly teach the system).

The terminology manager 432 receives normalized request data from the request dispatcher and classifier 418, and manages terminology stored in a contextual network 434. In other words, the terminology manager 432 manages the known terminology used in the cascading learning system 404. In one embodiment, the terminology manager 432 includes a contextual network 434 and a terminology extractor 442.

The contextual network 434 contains terminology definitions built using semantic objects and relations as previously described with respect to FIG. 1. As illustrated in FIG. 4, this terminology may be accessed by the request dispatcher and classifier 418 to classify a request and dispatch the request to the appropriate domain-specific modules 422, 424. Further, this terminology may be accessed by the domain-specific modules 422, 424 for operations related to generating predictions. Depending on the operational setting, the terminology of the contextual network 434 may be grouped into a variety of categories. For example, the contextual network 434 in FIG. 4 includes the following categories:

Provider terminology 436: this group includes terminology similar to a business dictionary (e.g., SAP term).

Common terminology 438: this group combines terminology from all knowledge domains (e.g., dictionaries and common reference materials).

Domain specific terminology 440: this group includes terminology from specific knowledge domains (e.g., medicine, engineering).

The terminology extractor 442 extracts terminology from particular domain-specific repositories (e.g., document management system (DMS) 426, business application 428, and/or business objects, from business data source systems 406).

The cluster manager 430 controls data flow between the request dispatcher and classifier 418, the search module container 420, the terminology manager 432, and business data source systems 406. In one embodiment, the cluster manager 430 organizes the structure and cluster (e.g., manages training, validation and test sets for the ANN and FFNN components, controls cluster data flow, e.g., controls input data used in particular modules). The business data source systems 406 include DMS 426 and business application 428.

Each domain-specific module 422 (DSM) supports the access to data stored/provided in particular business data source systems 406. In one embodiment, the DSM 422 provides training examples which are used by the cluster manager 430 to train the request dispatcher and classifier 418 with training and test sets for the ANN. In another embodiment, the DSM 422 could, be trained in a separate step; this means that the DSM 422 may already contain trained FFNN or provide (similar to ANN) training and test sets for the FFNN.

In some embodiments the cluster manager 430 initializes the building of the terminology repository including the contextual network 434. In other words, the cluster manager 430 imports the provider terminology 436. The terminology extractor 442 of the terminology manager 432 extracts the terminology from DMS 426 and from business application 428. Then, the terminology manager 432 classifies the terminology into common terminology 438 and domain specific terminology 440. The classification may be used to optimize or tune the request processing for particular modules (ANN and FFNN elements) and can be calculated using statistical methods.

For example, the classification algorithm may perform statistical calculations using the following indicators:

(STI) significant term indicator=number of documents containing term/total number of documents;

(DSTI) domain significant term indicator=number of documents containing term in domain/total number of documents in domain.

The analysis of the indicators and their relations enables the classification of the terms: which term is more significant for a particular domain, which term is a common term used for classification, and which term is irrelevant. Irrelevant terms are, for example, terms that do not help the dispatch request (e.g., "is," "are," and "a"). In another embodiment, the terminology manager 432 may support configuration of different probability levels (e.g., high, medium, low) and the administrator may define which level is sufficient to decide where the term is placed.

In a typical operation of the cascading learning system 404, the client application 402 creates a request (document, message, search query) that is sent to the cascading teaming system 404. The request analyzer 416 is a component that uses the terminology definition and NLP (Natural Language Processing) methods. In other words, the request analyzer 416 analyzes the search request and determines the term context. The request analyzer 416 then prepares the search request to "normalized" data form. The "normalized" data is sent to the request dispatcher and classifier 418 that uses the common terminology and the ANN algorithm to determine the most probable domain-specific module 422, 424 from the search module container 420. In the next step, the "normalized" data is used together with the domain-specific module 422 or 424 to search/calculate (using FFNN) the relevant information (e.g., document, form, etc.).

Furthermore, each request data and the observed end-user interaction can be used as a source of training and test sets in learning algorithms. This means that if the information is somehow rated by the end-user, bookmarked, or used in a further business step, the system 404 automatically takes all the request information, its "normalized" form and internal classification (ANN), and search/calculation result (FFNN) to build an online training set which is then used as a fine-tuning step.

In one example implementation, the cascading learning system 404 running on the HANA platform of SAP is an open system that may integrate different business applications. The deep integration with contextual network and terminology classification allows the simplification by reduction of term amount and usage of significant terms.

Figure 5:
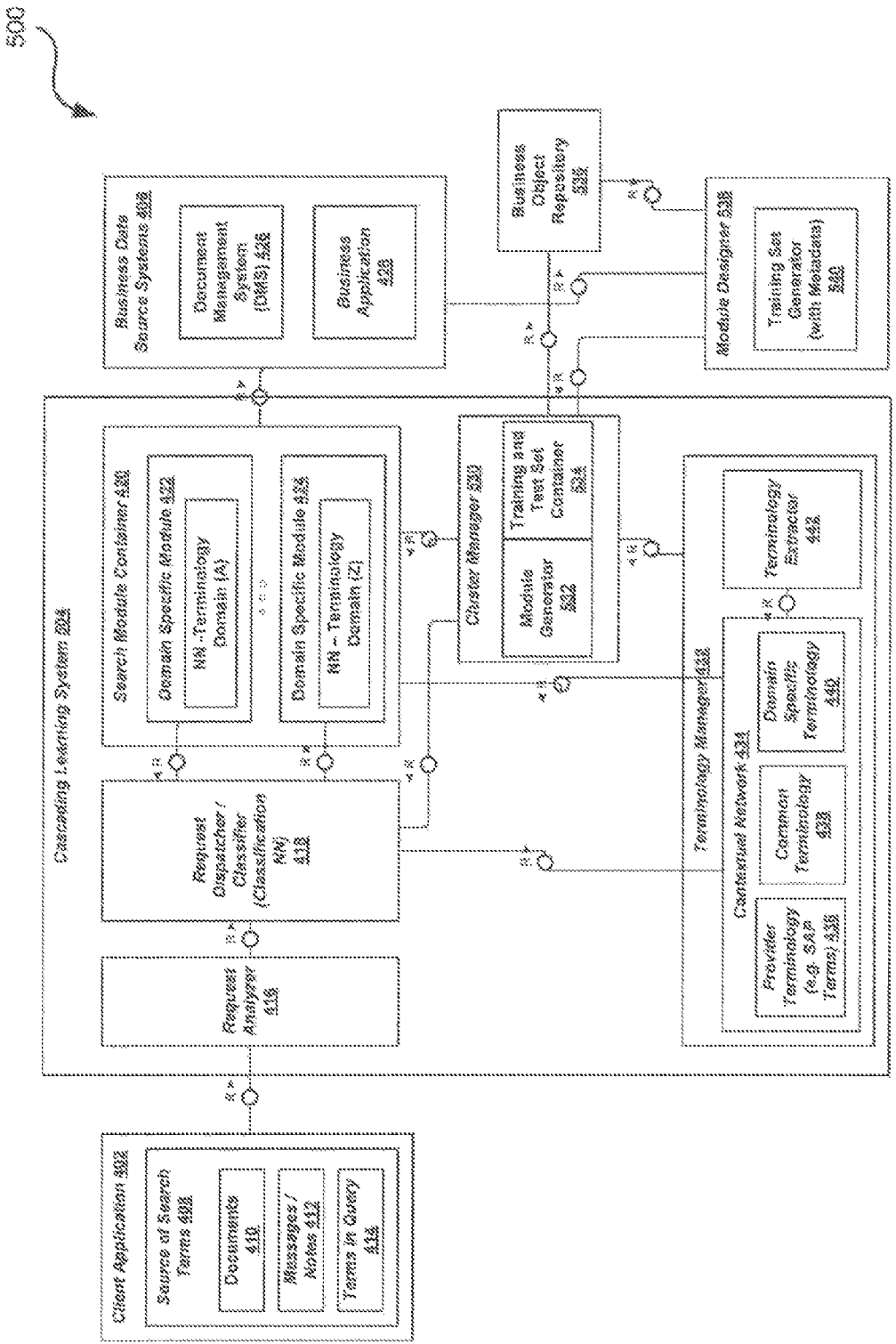
FIG. 5 is a block diagram illustrating an architectural overview of another cascading learning system, which includes a module generator with a training and test set container, in accordance with art example embodiment.

Certain embodiments enable selective generation, training and testing of a domain-specific module 422 included in the search module container 420. FIG. 5 is a block diagram that illustrates an architectural overview 500 that is similar to FIG. 4 in accordance with an example embodiment. Similarly as in the architectural overview 400 of FIG. 4, the architectural overview 500 includes a cascading learning, system 504 having related elements including, request analyzer 416, a request dispatcher and classifier 418, a search module container 420, a terminology manager 432, and a cluster manager 530. In this embodiment, the cluster manager 330 includes a module generator 532 and training and test set container 534. The cluster manager 530 communicates with a business-object repository 536 and a module designer 538 including a training set generator (with metadata) 540. Additionally, the module designer 538 communicates with the business data source systems 406.

Figure 6:
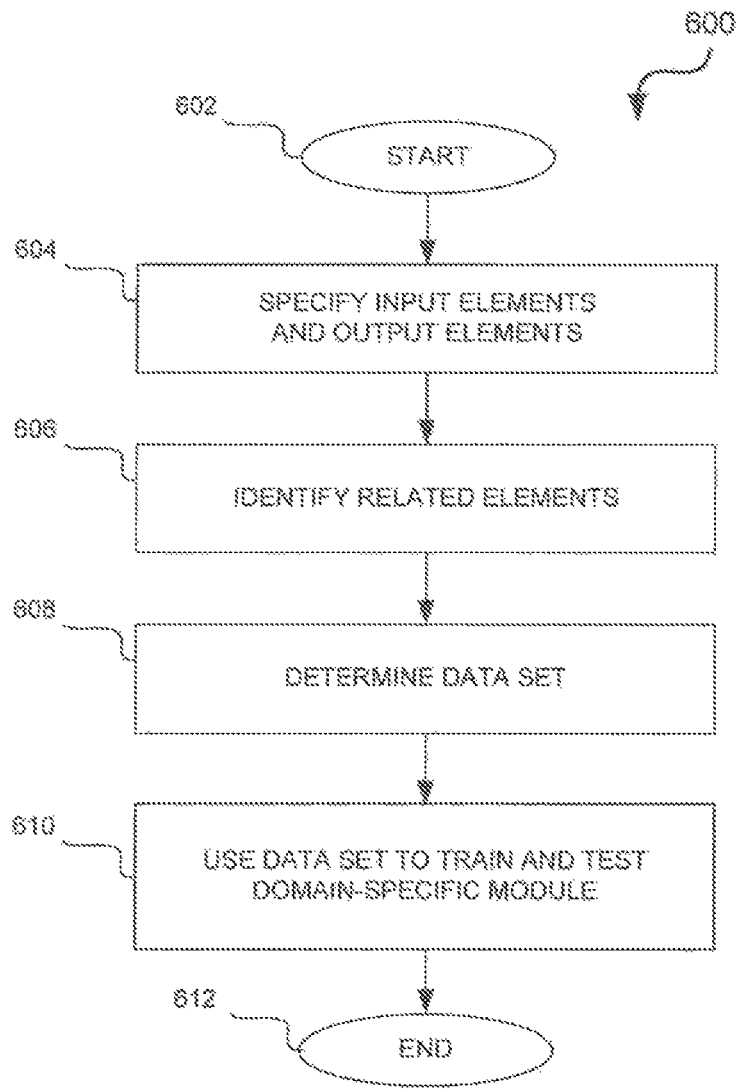
FIG. 6 depicts a flow diagram of a method for providing domain specific modules for domain-specific searches in the cascading learning system of FIG. 5, in accordance with an example embodiment.

FIG. 6 depicts a flow diagram of a general overview of a method 600 for providing domain-specific modules for domain-specific searches in the cascading teaming system 504 of FIG. 5. The method 600 may begin at a starting operation 602.

A first operation 604 includes specifying one or more input elements and one or more output elements for a domain-specific search in a domain, with the domain including data that relates the one or more input elements to the one or more output elements. For example, to support a search related to automobiles, the input elements may include criteria for fuel efficiency (e.g., miles per gallon (MPG)) and cost (e.g., price), and the output elements may identify a suitable vehicle (e.g., make, model, year). Additional elements may be added as inputs or outputs (e.g., luxury features, warranties, insurance cost). In the context of a purchase order for some item or material, the two input elements may be an item/material identifier and a purchasing address (e.g., seller's location), and a single output element may be the delivery address (e.g., buyer's location). Additional elements may be added as inputs or outputs (e.g., price).

A second operation 606 includes identifying one or more related elements corresponding to metadata in the domain for the one or more input elements or output elements. For example, the metadata may include semantic terms that are incorporated into the contextual network 434. In the context of an automobile search, the metadata, may include alternative terms (e.g., car, vehicle), and relevant semantic descriptors (e.g., luxury, economy, off-road, hybrid). Related elements may be identified automatically based on the associations of the contextual network 434 with or without user input.

A third operation 608 includes determining a data set corresponding to the one or more input elements, output elements, and related elements in the domain. This data set may include a variety of information including input element identifiers (IDs), output element IDs, related element IDs, and links to related information. In general, an input element ID identifies an input element that is related to an existing business object (BO) definition, and similarly an output element ID identifies an output element that is related to an existing BO definition. A related element ID may also be related to an existing BO definition or alternatively be defined through a link (e.g., to a formula that defines a calculation based on existing BO definitions). For example, in a case where the total weight of a system is relevant, a corresponding related element ID may identify a formula that calculates the weight of the system by summing weight values corresponding to components of the system, where each component has a corresponding business object that includes the component's weight. The data set also typically includes one or more fields that identify the source or sources of the data values including whether the data values are original values from an application or calculated values based on some combination or modification of one or more applications. Using consistent IDs for the elements corresponding to the data set facilitates consistent use and reuse of these elements in the cascading learning system 504.

A fourth operation 610 includes using the data set to train and test a domain-specific module that relates the one or more input elements, output elements and related elements, with the domain-specific module operating to receive input values for the one or more input elements and provide output values for the one or more output elements. For example, the output values may identify a relevant document related to the domain, with the relevant document corresponding to a domain-specific search remit for a search defined by the input values. As is typical in many applications of artificial intelligence (AI), the data set may be split into two portions, where the first portion is used for training the module and the second portion is used for testing the module.

The domain-specific module may include a feed-forward neural network (FFNN) with input nodes with values corresponding to the input elements and related elements (e.g., metadata), one or more internal nodes, and output nodes with values corresponding to the domain-specific search result (e.g., a document related to the domain). In some embodiments the training and testing may be carried out for several FFNNs for a specification of input elements, output elements, related elements and test data, and then a test score (e.g., a data-fitting calculation) may be calculated for each FFNN so that the top-scoring FFNN may be chosen for the domain-specific module. The structure of the FFNNs may be varied, for example, by the number of internal layers and the number of nodes in each layer. In cases where no FFNN tests adequately, additional FFNNs may be generated. Alternatively, other structural features may be varied including the input elements, the output elements, the related elements based on metadata, and the data set corresponding to the relevant domain. Depending on the operational setting, a different choice of metadata may substantially broaden or narrow the relevant domain or search space. For example, "hybrid car" may be broadened to "fuel-efficient vehicle" or narrowed to a specific model or performance criterion.

The method 600 then ends at ending operation 612. With reference to the embodiment of FIG. 5, the first three operations 604, 606, 608 may be performed at the module designer 538 and the fourth operation 610 may be performed at the cluster manager 530, including testing and training operations by the module generator 532 on the data set, which is stored at the training and test set container 534. The module designer 538 may access the business-object repository 536, which includes business objects having fields corresponding to the one or more input elements, the one or more output elements and the metadata corresponding to the one or more related elements where the metadata includes semantic labels related to the one or more input elements or output elements. The module designer 538 may also access the business-data scarce systems 406 to obtain business data that includes values for the one or more input elements, output elements, and related elements (e.g., the data set for testing and training the domain-specific module 422). A user interface may facilitate access by the module designer 538 to the business-object repository 536 in order to enable the selection of the input and output elements and optionally the identification of the related elements corresponding in metadata. Alternatively the identification of the related elements may be automated so that the user only needs to ideas on the input and output elements. Similarly, a user interface may facilitate access by the module designer 538 to the business data source systems 406 in order to enable selection of the relevant data set from the DMS 426 or a business application 428.

After the domain-specific module 422 has been trained and tested by the cluster manager 530, it may be included in the search module container 420 (e.g., as a first domain-specific module 422 in a plurality of domain-specific modules). To integrate this newly generated domain-specific module 422 into the cascading learning system 504, the cluster manager 530 may also use portions of the data set to train and test a classification module that classifies a search request at the request dispatcher and classifier 418 for operations by one of the domain-specific modules 422, 424 included in the search module container 420. The classification module may include an artificial neural network (ANN) that identifies a domain-specific module corresponding to the search request. For example, the classification module may be a FFNN with input nodes corresponding to values from the normalized search request, one or more internal nodes, and output nodes with values corresponding to a choice for one of the domain-specific modules 422, 424 in the search module container 420. In some contexts, this domain-specific module 422 may be described as a pluggable module because of its easy incorporation into the cascading learning system 504.

Figure 7:
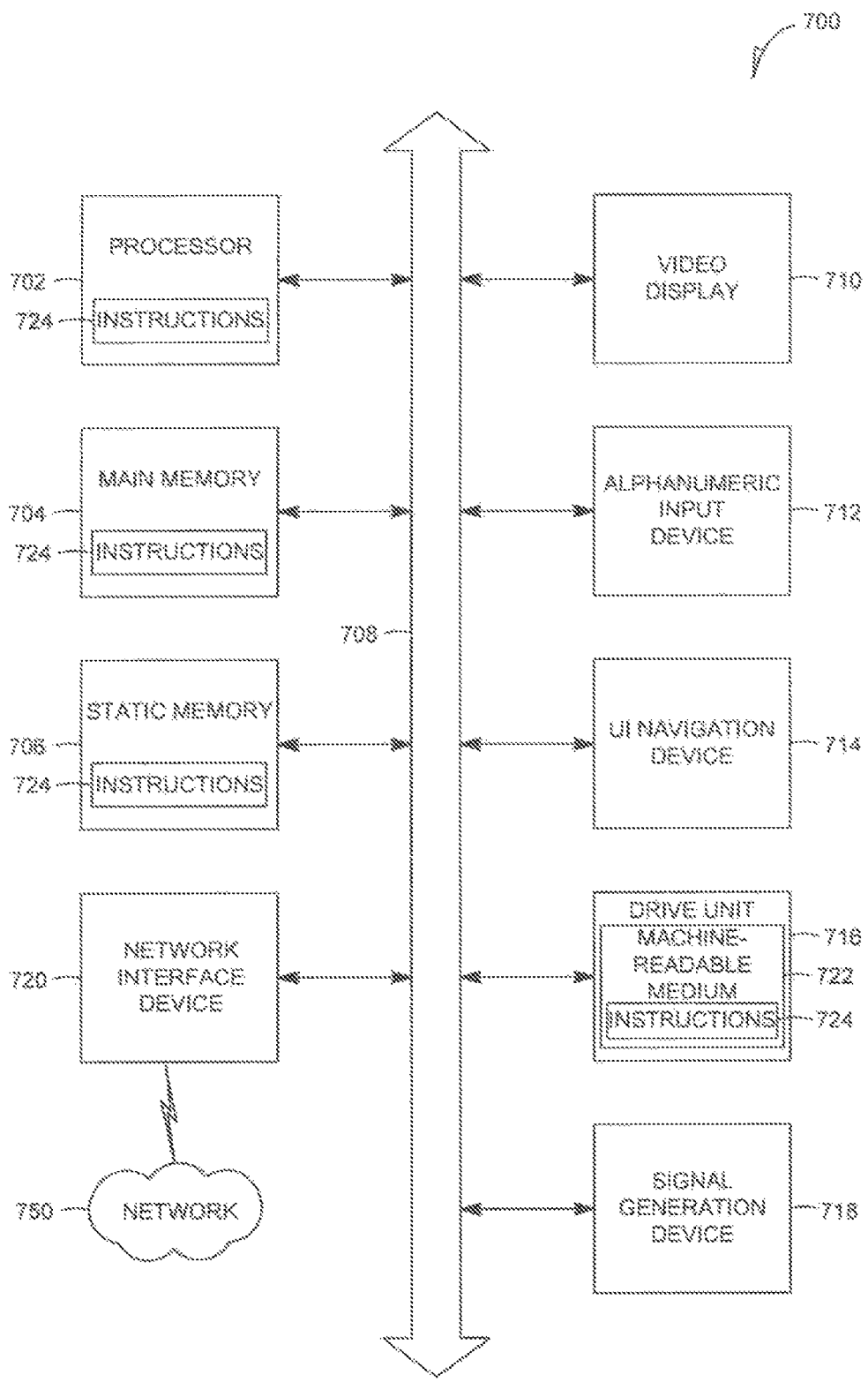
FIG. 7 is a block diagram depicting a machine in the example form of a computing device within which may be executed a set of instructions for causing the machine to perform any one or more of the methodologies discussed herein.

FIG. 7 depicts a block diagram of a machine in the example form of a computing device 700 within which may be executed a set of instructions for causing the machine to perform any one or more of the methodologies discussed herein (e.g., as a computer-executable unit). In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set for multiple sets) of instructions to perform any one or more of the methodologies discussed herein.

The example of the computing device 700 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The computing device 700 may further include video display unit 710 (e.g., a plasma display, a liquid crystal display (LCD) or a cathode ray tube (CRT)). The computing device 700 also includes an alphanumeric input device 712 (e.g., a keyboard), a user interlace (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 (e.g., a non-transitory computer-readable medium) on which is stored one or more sets of data structures and instructions 724 (e.g., software) embodying or utilized by any one or more of the methodologies or functions described herein. The data structures and instructions 724 may also reside, completely or at least partially, within the main memory 704, static memory 706, and/or within the processor 702 during execution thereof by computing device 700, with the main memory 704 and processor 702 also constituting machine-readable, tangible media.

The data structures and instructions 724 may further be transmitted or received over a computer network 750 via network interlace device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or ASIC) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respectively different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment, or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fail within the scope of the embodiment(s).

What is claimed is:

1. A method of providing domain-specific modules for domain-specific searches, the method comprising:
    specifying one or more input elements and one or more output elements for a domain-specific search in a domain, the domain including data that relates the one or more input elements to the one or more output elements;
    identifying one or more related elements corresponding to metadata in the domain for the one or more input elements or output elements;
    determining a data set corresponding to the one or more input elements, output elements, and related elements in the domain; and
    using the data set, by utilizing at least one processor, to train and test a domain-specific module that relates the one or more input elements, output elements and related elements, the domain-specific module operating to receive input values for the one or more input elements and provide output values for the one or more output elements, and the output elements identifying a relevant document related to the domain, the relevant document corresponding to a domain-specific search result for a search defined by the input values.

2. The method of claim 1, wherein the domain-specific module is a first domain-specific module and the method further comprises:
    using the data set to train and test a classification module that classifies a search request for operations by one of a plurality of domain-specific modules including the first domain-specific module, the classification module including an artificial neural network (ANN) that identifies a domain-specific module corresponding to the search request.

3. The method of claim 1, wherein the domain-specific module includes a feed-forward neural network (FFNN) that includes one or more internal layers.

4. The method of claim 1, wherein the training and testing of the domain-specific module includes:
    training and testing a plurality of feed-forward neural networks (FFNNs) that each include one or more internal layers, the FFNNs each having a test score based on the testing of the FFNNs with a portion of the data set;
    selecting a first FFNN from the plurality of FFNNs based on the test scores; and
    implementing the first FFNN in the domain-specific module.

5. The method of claim 1, wherein the specifying of the one or more input elements and output elements includes accessing a business-object repository associated with the domain, the business-object repository including business objects having fields corresponding to the one or more input elements and output elements, and the identifying of the one or more related elements includes accessing the business-object repository to identify fields corresponding to the metadata, the metadata including one or more semantic labels related to the one or more input elements or output elements.

6. The method of claim 1, wherein the determining of the data set includes accessing a business-data source associated with the domain to obtain business data that includes values for the one or more input elements, output elements, and related elements.

7. A non-transitory computer-readable medium that stores a computer program for providing domain-specific modules for domain-specific searches, the computer program including instructions that, when executed by at least one computer, cause the at least one computer to perform operations comprising:
    specifying one or more input elements and one or more output elements for a domain-specific search in a domain, the domain including data that relates the one or more input elements to the one or more output elements;
    identifying one or more related elements corresponding to metadata in the domain for the one or more input elements or output elements;
    determining a data set corresponding to the one or more input elements, output elements, and related elements in the domain; and
    using the data set to train and test a domain-specific module that relates the one or more input elements, output elements and related elements, the domain-specific module operating to receive input values for the one or more input elements and provide output values for the one or more output elements, and the output elements identifying a relevant document related to the domain, the relevant document corresponding to a domain-specific search result for a search defined by the input values.

8. The computer-readable medium of claim 7, wherein the domain-specific module is a first domain-specific module and the computer program includes instructions that, when executed by the at least one computer, cause the at least one computer to perform operations comprising:
    using the data set to train and test a classification module that classifies a search request for operations by one of a plurality of domain-specific modules including the first domain-specific module, the classification module including an artificial neural network (ANN) that identifies a domain-specific module corresponding to the search request.

9. The computer-readable medium of claim 7, wherein the domain-specific module includes a feed-forward neural network (FFNN) that include one or more internal layers.

10. The computer-readable medium of claim 7, wherein the training and testing of the domain-specific module includes:
training and testing a plurality of feed-forward neural networks (FFNNs) that each include one or more internal layers, the FFNNs each having a test score based on the testing of the FFNNs with a portion of the data set;
selecting a first FFNN from the plurality of FFNNs based on the test scores; and
implementing the first FFNN in the domain-specific module.

11. The computer-readable medium of claim 7, wherein the specifying of the one or more input elements and output elements includes accessing a business-object repository associated with the domain, the business-object repository including business objects having fields corresponding to the one or more input elements and output elements, and the identifying of the one or more related elements includes accessing the business-object repository to identify fields corresponding to the metadata, the metadata including one or more semantic labels related to the one or more input elements or output elements.

12. The computer-readable medium of claim 7, wherein the determining of the data set includes accessing a business-data source associated with the domain to obtain business data that includes values for the one or more input elements, output elements, and related elements.

13. A system configured to provide domain-specific modules for domain-specific searches, the system comprising at least one computer that performs operations for computer-executable units including:
a module designer configured to perform operations including:
specifying one or more input elements and one or more output elements for a domain-specific search in a domain, the domain including data that relates the one or more input elements to the one or more output elements;
identifying one or more related elements corresponding to metadata in the domain for the one or more input elements or output elements; and
determining a data set corresponding to the one or more input elements, output elements, and related elements in the domain; and
a cluster manager configured to use the data set to train and test a domain-specific module that relates the one or more input elements, output elements and related elements, the domain-specific module operating to receive input values for the one or more input elements and provide output values for the one or more output elements, and the output elements identifying a relevant document related to the domain, the relevant document corresponding to a domain-specific search result for a search defined by the input values.

14. The system of claim 13, wherein the domain-specific module is a first domain-specific module and the cluster manager is further configured to use the data set to train and test a classification module that classifies a search request for operations by one of a plurality of domain-specific modules including the first domain-specific module, the classification module including an artificial neural network (ANN) that identifies a domain-specific module corresponding to the search request.

15. The system of claim 13, wherein the domain-specific module includes a feed-forward neural network (FFNN) that includes one or more internal layers.

16. The system of claim 13, wherein the training and testing of the domain-specific module includes:
training and testing a plurality of feed-forward neural networks (FFNNs) that each include one or more internal layers, the FFNNs each having a test score based on the testing of the FFNNs with a portion of the data set;
selecting a first FFNN from the plurality of FFNNs based on the test scores; and
implementing the first FFNN in the domain-specific module.

17. The system of claim 13, wherein the module designer is further configured to access a business-object repository associated with the domain, the business-object repository including business objects having fields corresponding to the one or more input elements, the one or more output elements and the metadata corresponding to the one or more related elements, the metadata including one or more semantic labels related to the one or more input elements or output elements.

18. The system of claim 13, wherein the module designer is further configured to access a business-data source associated with the domain to obtain business data that includes values for the one or mom input elements, output elements, and related elements.

19. The system of claim 13, wherein the domain-specific module is a first domain-specific module and the system further comprises computer-executable units including:
a search module container configured to implement a plurality of domain-specific modules including the first domain-specific module, each domain-specific module being configured to generate a prediction with a trained probability of an expected output;
a request analyzer configured to receive a request for search terms from a client application, to determine term context in the request, and to normalize request data from the term context;
a request dispatcher and classifier configured to classify the normalized request data and to dispatch the normalized request data to a corresponding domain-specific module included in the search-module container; and
a terminology manager configured to receive normalized request data from the request dispatcher and classifier and to manage terminology stored in a contextual network, the cluster manager being configured to control data flow between the module designer, the search module container, the request dispatcher and classifier, and the terminology manager.

20. A method of providing domain-specific modules for domain-specific searches, the method comprising:
specifying one or more input elements and one or more output elements for a domain-specific search in a domain, the domain including data that relates the one or more input elements to the one or more output elements;
identifying one or more related elements corresponding to metadata in the domain for the one or more input elements or output elements;
determining a data set corresponding to the one or more input elements, output elements, and related elements in the domain; and
using the data set, by utilizing at least one processor, to train and test a domain-specific module that relates the one or more input elements, output elements and related elements, the domain-specific module operating to receive input values for the one or more input elements and provide output values for the one or more output elements, and the domain-specific module including a feed-forward neural network (FFNN) that include one or more internal layers.

21. A non-transitory computer-readable medium that stores a computer program for providing domain-specific modules for domain-specific searches, the computer program including instructions that, when executed by at least one computer, cause the at least one computer to perform operations comprising:
specifying one or more input elements and one or more output elements for a domain-specific search in a domain, the domain including data that relates the one or more input elements to the one or more output elements;
identifying one or more related elements corresponding to metadata in the domain for the one or more input elements or output elements;
determining a data set corresponding to the one or more input elements, output elements, and related elements in the domain; and
using the data set to train and test a domain-specific module that relates the one or more input elements, output elements and related elements, the domain-specific module operating to receive input values for the one or more input elements and provide output values for the one or more output elements, and the domain-specific module including a feed-forward neural network (FFNN) that includes one or more internal layers.

22. A system configured to provide domain-specific modules for domain-specific searches, the system comprising at least one computer that performs operations for computer-executable units including:
a module designer configured to perform operations including:
specifying one or more input elements and one or more output elements for a domain-specific search in a domain, the domain including data that relates the one or more input elements to the one or more output elements;
identifying one or more related elements corresponding to metadata in the domain for the one or more input elements or output elements; and
determining a data set corresponding to the one or more input elements, output elements, and related elements in the domain; and
a cluster manager configured to use the data set to train and test a domain-specific module that relates the one or more input elements, output elements and related elements, the domain-specific module operating to receive input values for the one or more input elements and provide output values for the one or more output elements, and the domain-specific module including a feed-forward neural network (FFNN) that includes one or more internal layers.

23. A method of providing domain-specific modules for domain-specific searches, the method comprising:
specifying one or more input elements and one or more output elements for a domain-specific search in a domain, the domain including data that relates the one or more input elements to the one or more output elements;
identifying one or more related elements corresponding to metadata in the domain for the one or more input elements or output elements;
determining a data set corresponding to the one or more input elements, output elements, and related elements in the domain, the determining of the data set including accessing a business-data source associated with the domain to obtain business data that includes values for the one or more input elements, output elements, and related elements; and
using the data set, by utilizing at least one processor, to train and test a domain-specific module that relates the one or more input elements, output elements and related elements, the domain-specific module operating to receive input values for the one or more input elements and provide output values for the one or more output elements.

24. A non-transitory computer-readable medium that stores a computer program for providing domain-specific modules for domain-specific searches, the computer program including instructions that, when executed by at least one computer, cause the at least one computer to perform operations comprising:
specifying one or more input elements and one or more output elements for a domain-specific search in a domain, the domain including data that relates the one or more input elements to the one or more output elements;
identifying one or more related elements corresponding to metadata in the domain for the one or more input elements or output elements;
determining a data set corresponding to the one or more input elements, output elements, and related elements in the domain, the determining of the data set including accessing a business-data source associated with the domain to obtain business data that includes values for the one or more input elements, output elements, and related elements; and
using the data set to train and test a domain-specific module that relates the one or more input elements, output elements and related elements, the domain-specific module operating to receive input values for the one or more input elements and provide output values for the one or more output elements.

25. A system configured to provide domain-specific modules for domain-specific searches, the system comprising at least one computer that performs operations for computer-executable units including:
a module designer configured to perform operations including:
specifying one or more input elements and one or more output elements for a domain-specific search in a domain, the domain including data that relates the one or more input elements to the one or more output elements;
identifying one or more related elements corresponding to metadata in the domain for the one or more input elements or output elements; and
determining a data set corresponding to the one or more input elements, output elements, and related elements in the domain, the determining of the data set including accessing a business-data source associated with the domain to obtain business data that includes values for the one or more input elements, output elements, and related elements; and
a cluster manager configured to use the data set to train and test a domain-specific module that relates the one or more input elements, output elements and related elements, the domain-specific module operating to receive input values for the one or more input elements and provide output values for the one or more output elements.

* * * * *